United States Patent
Sjöberg et al.

(10) Patent No.: US 9,937,393 B2
(45) Date of Patent: Apr. 10, 2018

(54) PICTURE CODING AND DECODING

(71) Applicant: Telefonaktiebolaget L M Ericsson (publ), Stockholm (SE)

(72) Inventors: Rickard Sjöberg, Stockholm (SE); Clinton Priddle, Indooroopilly (AU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 611 days.

(21) Appl. No.: 14/465,111

(22) Filed: Aug. 21, 2014

(65) Prior Publication Data
US 2014/0362912 A1    Dec. 11, 2014

Related U.S. Application Data

(63) Continuation of application No. 13/144,369, filed as application No. PCT/SE2011/050876 on Jun. 29, 2011, now Pat. No. 8,861,587.

(60) Provisional application No. 61/366,215, filed on Jul. 21, 2010.

(51) Int. Cl.
*H04N 19/503*  (2014.01)
*A63B 53/04*  (2015.01)
*A63B 60/54*  (2015.01)

(52) U.S. Cl.
CPC ........ *A63B 53/047* (2013.01); *A63B 53/0475* (2013.01); *A63B 60/54* (2015.10); *A63B 2053/0408* (2013.01); *A63B 2053/0433* (2013.01); *A63B 2053/0454* (2013.01); *A63B 2053/0491* (2013.01)

(58) Field of Classification Search
CPC ......................... H04N 19/00575; A63B 53/047
USPC ..................................... 375/240.25
See application file for complete search history.

(56) References Cited

U.S. PATENT DOCUMENTS

| | | |
|---|---|---|
| 6,931,660 B1 | 8/2005 | Kalluri et al. |
| 8,532,185 B2 | 9/2013 | Jung et al. |
| 2010/0027680 A1 | 2/2010 | Segall et al. |

(Continued)

FOREIGN PATENT DOCUMENTS

| | | |
|---|---|---|
| WO | WO 2007/107170 A1 | 9/2007 |
| WO | WO 2010/067505 A1 | 6/2010 |

OTHER PUBLICATIONS

Wiegand: "Integrated FREXT input draft", 12. JVT Meeting; 69. MPEG Meeting; Jul. 17, 2004-Jul. 23, 2004; Redmond, US; (Joint Video Team of ISO/IEC JTC1/SC29/WG11 and ITU-T SG.16), No. JVT-L012d2wcmRelTod1, Jul. 23, 2004, 39 pages.*

(Continued)

*Primary Examiner* — Jonathan Messmore
(74) *Attorney, Agent, or Firm* — Sage Patent Group

(57) ABSTRACT

A picture with multiple slices is encoded by generating a coded slice representation for each of the slices. A slice flag is set to a first value for the first slice in the picture and corresponding slice flags of the remaining slices are set to a second defined value. A respective slice address is generated for each remaining slice to enable identification of the slice start position within the picture for the slice. A coded picture representation of the picture comprises the coded slice representations, the slice addresses and the slice flags. The slice flags enable differentiation between slices for which slice addresses are required and the slice per picture for which no slice address is needed to identify its slice start position.

20 Claims, 5 Drawing Sheets

(56) References Cited

U.S. PATENT DOCUMENTS

2012/0082218 A1    4/2012  Misra et al.
2012/0106652 A1*  5/2012  Huang .................. H04N 19/70
                                          375/240.25

OTHER PUBLICATIONS

Extended European Search Report corresponding to European Application No. EP 11 80 9949, dated Sep. 17, 2014, 10 pages.
Hannuksela: "Improved Coding of Slice Headers", 3. JVT Meeting; 60. MPEG Meeting; Jun. 5, 2002-Oct. 5, 2002; Fairfaz, US; (Joint Video Team of ISO/IEC JTC1/SC29/WG11 and ITU-T SG.16), No. JVT-0079, May 10, 2002, 8 pages.
Hannuksela: "Modifications to High-Level Syntax and Semantics", 4. JVT Meeting; 61. MPEG Meeting; Jul. 22, 2002-Jul. 26, 2002; Klagenfurt, AT; (Joint Video Team of ISO/IEC JTC1/SC29/WG11 and ITU-T SG.16), No. JVT-D094, Jul. 26, 2002, 12 pages.
Ichimura et al.: "A Tool for Interactive ROI Scalability", 74. MPEG Meeting; Oct. 17, 2005-Oct. 21, 2005; Nice; (Motion Pictureexpert Group or ISO/IEC JTC1/SC29/WG11), No. M12501, Oct. 12, 2005, 18 pages.
International Search Report, PCT Application No. PCT/SE2011/050876, dated Dec. 14, 2011.
Written Opinion of the international Searching Authority, PCT Application No. PCT/SE2011/050876, dated Dec. 13, 2011.
International Preliminary Report on Patentability, PCT Application No. PCT/SE2011/050876, dated Jan. 22, 2013.
Sjoberg et al., "CE4 Subsetl: Ericsson fine granularity slices", 96. MPEG meeting; Mar. 21-25, 2011; Geneva; (Motion Picture Expert Group or ISO/IEC JTC1/SC29/WG11), Mar. 17, 2011; p. 346-351, ISBN 1-4577-0252-5 Whole document.
Sjoberg et al., "Fine granularity slices", 3. JCT-VC meeting; 94. MPEG meeting; Oct. 7-15, 2010; Guangzhou; (Joint Collaborative Team on Video Coding of ISO/IECJTC1/SC29/WG11 and ITU-T SG. 16), Oct. 2, 2010, ISSN 0000-0045; Whole document.
Ugur et al., High Performance, Low Complexity Video Coding and the Emerging HEVC Standard:, IEEE Transactions on Circuits and Systems for Video Technology, Dec. 1, 2010, IEEE Service Center, Piscataway, NJ, p. 1688-1697, ISSN 1051-8215; whole document.
Han et al., "Improved Video Compression Efficiency Through Flexible Unit Representation and Corresponding Extension of Coding Tools", IEEE Transactions on Circuits and Systems for Video Technology, Dec. 1, 2010, IEEE Service Center, Piscataway, NJ, p. 1709-1720, ISSN 1051-8215; whole document.
Huang et al., "Description of Core Experiment 4 (CE4): Slice Boundary Processing and Fine Granularity", 95. MPEG meeting; Jan. 24-28, 2011; Daegu;( Motion Picture Expert Group or ISO/IEC JTC1/SC29/WG11), Feb. 17, 2011, m19504; whole document.

* cited by examiner

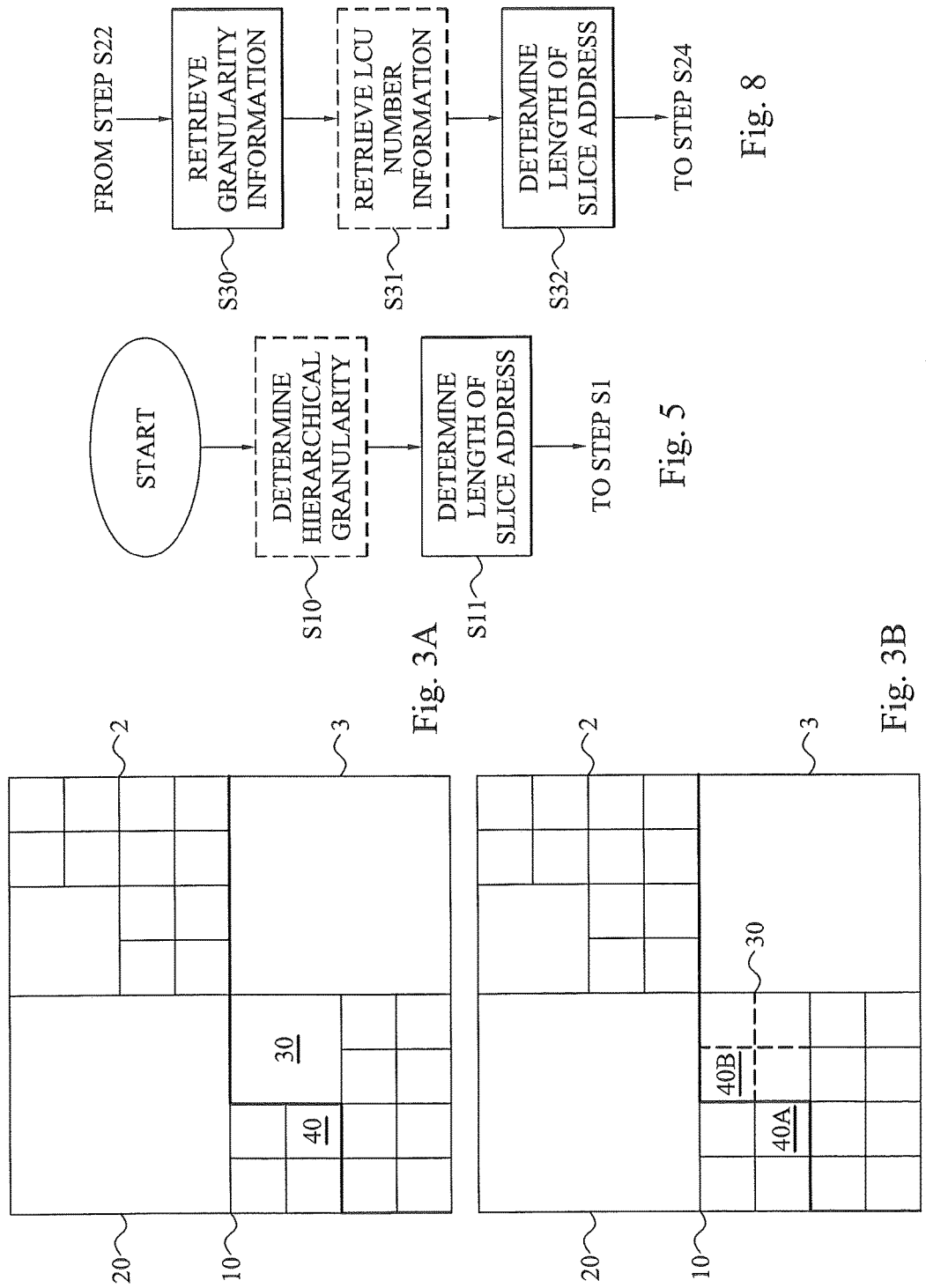

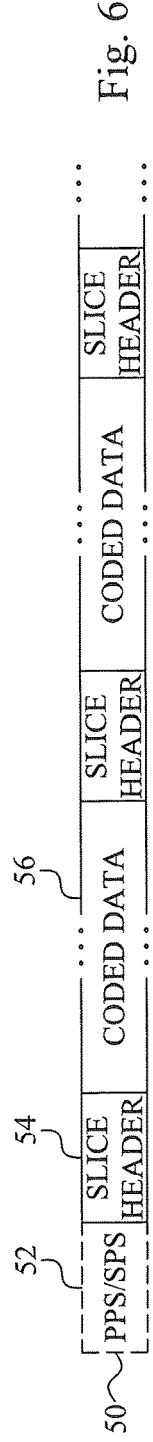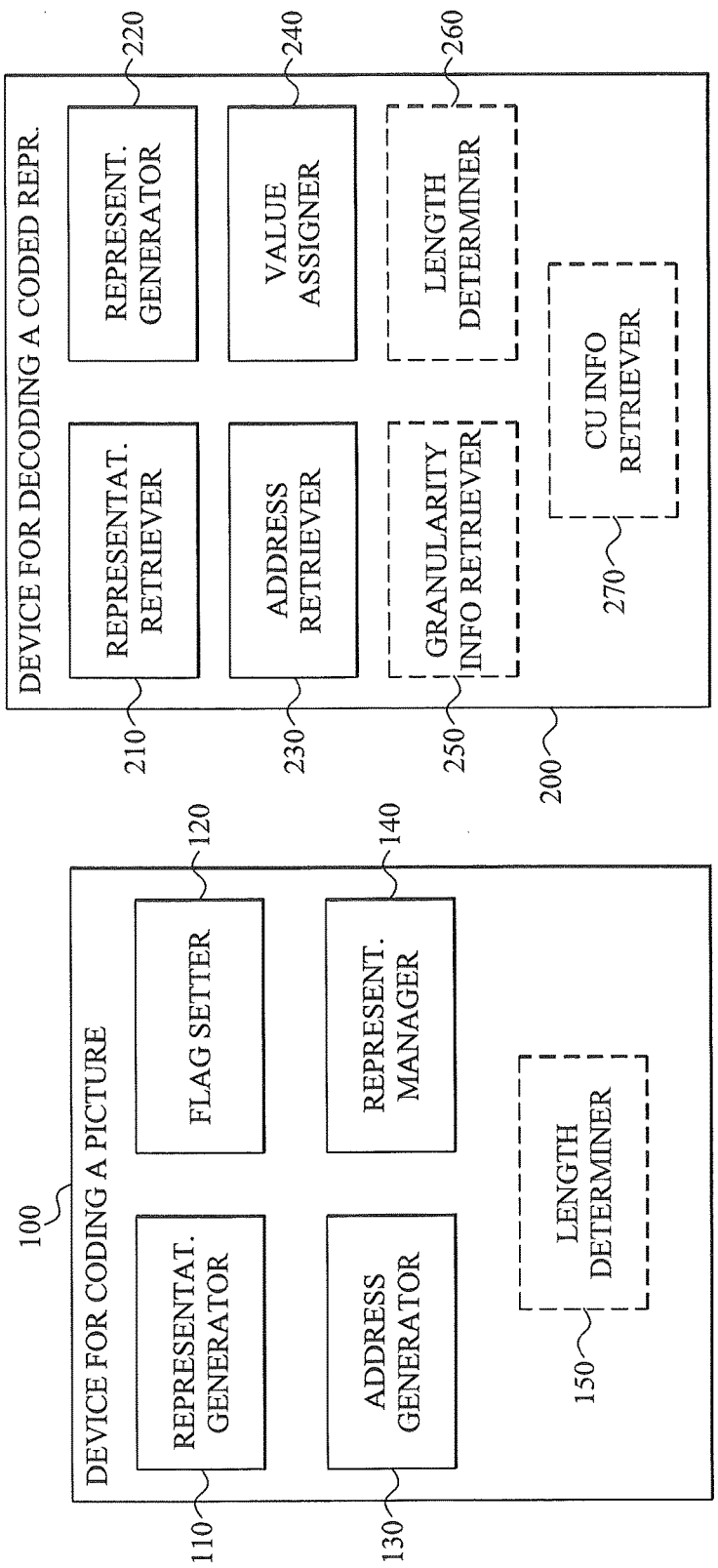

PICTURE CODING AND DECODING

CROSS REFERENCE TO RELATED APPLICATIONS

This application is a continuation of U.S. patent application Ser. No. 13/144,369, filed Nov. 9, 2011, which itself is a 35 U.S.C. § 371 national stage application of PCT International Application No. PCT/SE2011/050876, filed on 29 Jun. 2011, which itself claims priority to U.S. provisional Patent Application No. 61/366,215, filed 21 Jul. 2010, the disclosure and content of all of which are incorporated by reference herein in their entirety.

TECHNICAL FIELD

The present embodiments generally relate to processing of pictures or video frames, and in particular to the coding and decoding of such pictures or video frame.

BACKGROUND

H.264, also referred to as MPEG-4 (Motion Picture Expert Group) AVC (Advanced Video Coding), is the state of the art video coding standard. It is a hybrid codec that is based on eliminating redundancy between frames, denoted so-called inter coding, and within frames, denoted so called intra coding. The output of the coding process is VCL (Video Coding Layer) data, which is further encapsulated into NAL (Network Abstraction Layer) units prior transmission or storage.

In H.264/MPEG-4 AVC a picture of a video stream is composed of macroblocks with a fixed size of 16×16 pixels and the coding of the picture proceeds macroblock by macroblock. Each picture of the video stream is divided into one or more slices. A slice is an independently decodable piece of the picture. This means that if one slice of a picture is lost, the other slices of the picture are still decodable. In addition, slices can be used for parallel coding and decoding since they are independent from other slices in the picture. In H.264/MPEG-4 AVC a slice boundary must occur between the border of two adjacent, according to the coding order, macroblocks.

HEVC (High Efficiency Video Coding) is a successor to H.264/MPEG-4 AVC. HEVC aims to substantially improve coding efficiency compared to H.264/MPEG-4 AVC, i.e. reduce the bitrate requirements while keeping the picture quality. HEVC is targeted at next-generation HDTV (High Definition Television) displays and content capture systems which feature progressive scanned frame rates and display resolutions from QVGA (Quarter Video Graphics Array) (320×240) up to 1080p and Ultra HDTV (7680×4320), as well as improved picture quality.

HEVC enables usage of so-called largest coding units (LCUs) that are blocks of pixels having a size that is larger than the macroblocks of H.264/MPEG-4 AVC to provide improved coding efficiency. In order to handle both large homogenous areas and small detailed areas in the same picture a hierarchical coding has been proposed for HEVC. The LCUs in a picture are scanned in a predefined order and each such LCU may be split into smaller coding units (CUs), which in turn may be split hierarchically in a quadtree fashion down to a smallest coding unit (SCU). A picture may, thus, be encoded as a mixture of coding units with different sizes ranging from the LCUs down to the SCUs.

In correspondence to H.264/MPEG-4 AVC a picture of a video stream can be divided into one or more slices in HEVC. The slice boundary is in HEVC aligned with the border of two adjacent, according to a predefined order, LCUs.

Both the H.264/MPEG-4 AVC and HEVC standards require the determination and usage of addresses in order to identify the first macroblock or coding unit of a slice and thereby the start of the slice in the picture or video frame. Such addresses, although necessary at the decoder, add overhead to the coded picture data. Furthermore, with the introduction of hierarchical splitting of the LCU in HEVC new challenges in connection with coding and decoding of pictures or video frames arise. There is therefore a need for an efficient coding and decoding that can handle the addresses of slice starts in an efficient and flexible manner.

SUMMARY

It is a general objective to provide an efficient management of slices in pictures and video frames.

It is a particular objective to signal slice start positions in an efficient way.

These and other objectives are met by embodiments as disclosed herein.

An aspect of the embodiments defines a method of coding a picture comprising multiple slices. A coded slice representation is generated for each slice in the picture based on the pixel values of the pixels in the slice. A respective slice flag is assigned to and set for each of the slices. The first slice in the picture has a slice flag set to a first defined value, whereas remaining slices have their respective slice flag set to a second defined value. Slice addresses allowing identification of the position of a first coding unit of a slice and thereby the slice start within the picture are generated for the remaining slices excluding the first slice in the picture. These slice addresses are included together with the coded slice representations and the slice flags into a coded picture representation of the picture.

Another aspect of the embodiments relates to a device for coding a picture comprising multiple slices. A representation generator of the device generates a respective coded slice representation for each slice in the picture. The device comprises a flag setter configured to set a slice flag associated with a first slice in the picture to a first value, whereas the slice flag(s) of the remaining slice(s) is(are) set to a second defined value. An address generator generates a respective slice address for each slice of the remaining slice(s) to enable identification of a respective position of a first coding unit and slice start of the slice within the picture. A representation manager generates a coded picture representation for the picture comprising the coded slice representations, the slice addresses and the slice flags.

A further aspect of the embodiments defines a method of decoding a coded picture representation of a picture comprising multiple slices. A slice flag associated with a slice in the picture is retrieved from the coded picture representation. The value of this slice flag is employed in order to determine whether a slice address needs to be retrieved from the coded picture representation in order to identify the start position of the slice within the picture and the portion of the slice that belongs to the slice. If the slice flag has a first defined value, the present slice is the first slice in the picture. Pixel values of pixels in the slice generated by decoding a coded slice representation associated with the slice and retrieved from the coded picture representation are then assigned to a first portion of the picture starting with a defined slice start within the picture, such as top left corner. If the slice flag instead has a second defined value, the slice address is employed to identify the slice start within the picture and pixel values generated by decoding the coded slice representation of the pixel are assigned to the portion of the picture starting with the identified slice start.

Yet another aspect of the embodiments relates to a device for decoding a coded picture representation of a picture comprising multiple slices. A representation retriever of the device retrieves a slice flag associated with a slice to be decoded from the coded picture representation. An address retriever retrieves a slice address from the coded picture representation if the slice flag has a second defined value. If the slice flag instead has a first defined value a representation generator generates a decoded representation of the pixel values of pixels in the slice based on a coded slice representation associated with the slice and retrieved from the coded picture presentation. These pixel values are then assigned by a value assigner to a first portion of the picture starting at a defined start position that is identified without the need for any signaled slice address, for instance the top left corner. If the slice flag instead has the second defined value the retrieved slice address is employed by the value assigner in order to identify the start of a portion of the picture that belongs to the current slice and then assign pixel values from the representation generator to this identified portion.

The embodiments provide an efficient management of slices within pictures or video frames in terms providing an efficient way of signaling and identifying slice start positions within a picture or video frame. The slice flags of the embodiments provide a significant improved identification of slice starts for the first slices in the picture but without any need for slice address signaling and calculation at the decoder.

BRIEF DESCRIPTION OF THE DRAWINGS

The invention, together with further objects and advantages thereof, may best be understood by making reference to the following description taken together with the accompanying drawings, in which:

FIGS. 3A and 3B illustrate embodiments of a slice start coinciding with a border between coding units within a LCU;

FIG. 5 is a flow diagram illustrating additional steps of the coding method in FIG. 1 according to an embodiment;

FIG. 6 schematically illustrates an embodiment of a coded picture representation;

FIG. 8 is a flow diagram illustrating additional steps of the method in FIG. 7 according to an embodiment;

FIG. 10 is a schematic block diagram of a device for coding a picture according to an embodiment;

FIG. 11 is a schematic block diagram a device for decoding a coded picture representation according to an embodiment.

DETAILED DESCRIPTION

Throughout the drawings, the same reference numbers are used for similar or corresponding elements.

The embodiments generally relate to the management of slices within pictures or video frames. In more detail, the embodiments provide a flexible and bit efficient way of signaling slice start addresses. The embodiments are applicable to any picture or video frame coding and decoding in which a picture or video frame, for instance of a video stream, can comprise multiple, i.e. at least two, slices and where the start of the slices need to be signaled to the decoder. The embodiment can therefore be applied to the state of the art picture or video coding, such as H.264/MPEG-4 AVC, but is in particular highly applicable to picture coding and decoding which utilize hierarchical splitting of blocks of pixels into smaller blocks of pixels. The embodiments are therefore well suited to be used in connection with High Efficiency Video Coding (HEVC) but are not limited thereto.

A characteristic of the embodiments is to differentiate between the first slice in the picture or video frame and remaining slices. In the prior art, a slice address is determined during encoding for each slice in the picture and is included in the coded picture representation of the picture to be used by a decoder in order to identify the start of the slice within the area of the picture or video frame. Depending on the total size of the picture, these slice addresses can be quite long and thereby add a significant amount of overhead to the coded picture data. For instance, a H.264/MPEG-4 AVC picture or video frame could consist of 1280×960 pixels. If the slice start is aligned with macroblock borders and the slice start is expressed as X and Y coordinates relative a fixed origin, typically the upper left corner of the picture, the slice address would need to be $\log_2(\text{ceil}(1280/16))+\log_2(\text{ceil}(960/16))=7+6=13$ bits in this simple example. Ceil( ) denotes the ceiling function defined as $\text{ceil}(x)=\lceil x \rceil$ and outputs the smallest integer not less than x. This might not be a very much data but with the frame and bit rates of today for video decoding and rendering, several hundreds of slices are typically accessed each second so the total size amount of slice address data that needs to be generated and forwarded at the encoder to the decoder is quite significant for a video stream. In addition, slice addresses need to be located, retrieved and processed at the decoder before the actual pixel data of a slice can be decoded and assigned to the correct part of the picture.

Figure 2:
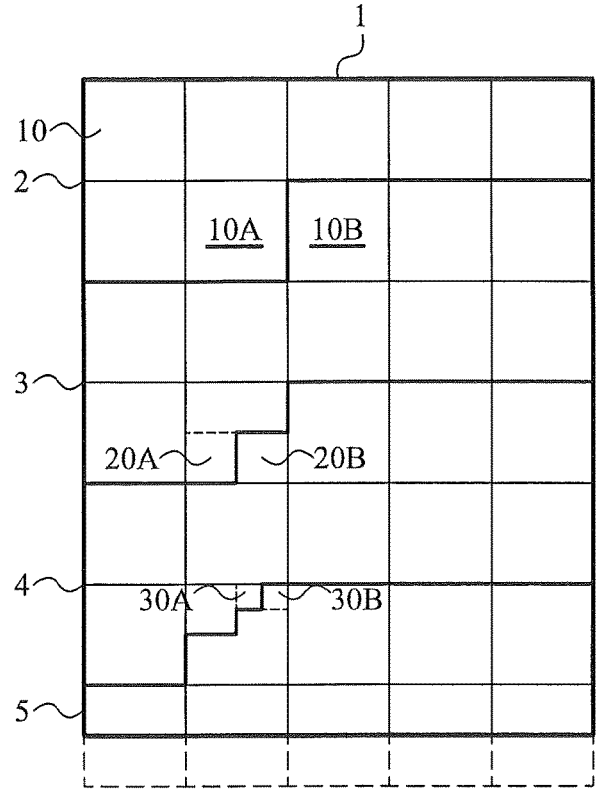
FIG. 2 illustrates an embodiment of a picture divided into multiple slices and comprising multiple largest coding units (LCUs)

The above mentioned problems with handling slice addresses can become even more prominent when hierarchical coding and decoding, such as in HEVC, is employed if slice starts can be aligned at coding units of a lower level than the largest coding units. FIG. 2 schematically illustrates this concept.

A picture 1, such as of a video frame in a video stream, can be divided into a number of largest coding units (LCUs) 10, also denoted largest coding tree blocks (LCTBs) or largest coding blocks (LCBs) in the art. The LCU 10 is the largest possible block of pixels that can be handled during encoding and decoding, and can be processed, for instance, according to the well known intra or inter encoding/decoding modes. The LCU 10 can in turn be hierarchically split into a number of smaller, in terms of number of pixels, blocks of pixels, typically denoted coding units (CUs) 20A, 20B, coding tree blocks (CTBs) or coding blocks (CBs).

These CUs 20A, 20B may in turn be split further into even smaller blocks 30A, 30B of pixels in a hierarchical manner down to a smallest possible block of pixels, denoted smallest coding unit (SCU) smallest coding tree block (SCTB) or smallest coding block (SCB).

In clear contrast to the prior art techniques that limit the positioning of the start of slice 2, 3 in a picture 1 to be aligned with the border between two adjacent LCUs 10A, 10B, some embodiments provide a much more flexible slice start positioning by potentially enable the start of the slice 4, 5 to be aligned with the border between any adjacent CUs 10A, 10B, 20A, 20B, 30A, 30B in the picture from the SCU level up to the LCU level. Hence, it is then possible that the slice start will be positioned inside an LCU with the last CU of the preceding slice and the first CU of the current slice in the same LCU. FIG. 2 schematically illustrates this. The border between a first slice 2 and a second slice 3 coincide with the border of two adjacent, according to the processing order, LCUs 10A, 10B. The border between the second slice 3 and a third slice 4 is instead aligned with the border of two coding units 20A, 20B that are each one quarter in size as compared to a LCU 10. Correspondingly, the border between the third slice 4 and a fourth slice 5 is in FIG. 2 aligned with the border of two CUs 30A, 30B, each 1/16 in size as compared to a LCU 10.

However, the hierarchical splitting and slice starts aligned to small CUs, possibly even the SCUs, can result in even longer slice addresses as compared to MPEG-4/AVC. For instance and the previously discussed example, a picture of 1280×960 pixels can have 19200 potential slice start positions if the slice starts can be aligned with border of SCUs of 8×8 pixels. If the slice addresses are then in the form of X and Y coordinates they would need to be 8+7=15 bits.

According to the embodiments, "slice" is employed to denote an independently codable and decodable portion of a picture or video frame. A picture can thereby be composed of a single slice or multiple, i.e. at least two, slices.

Figure 1:
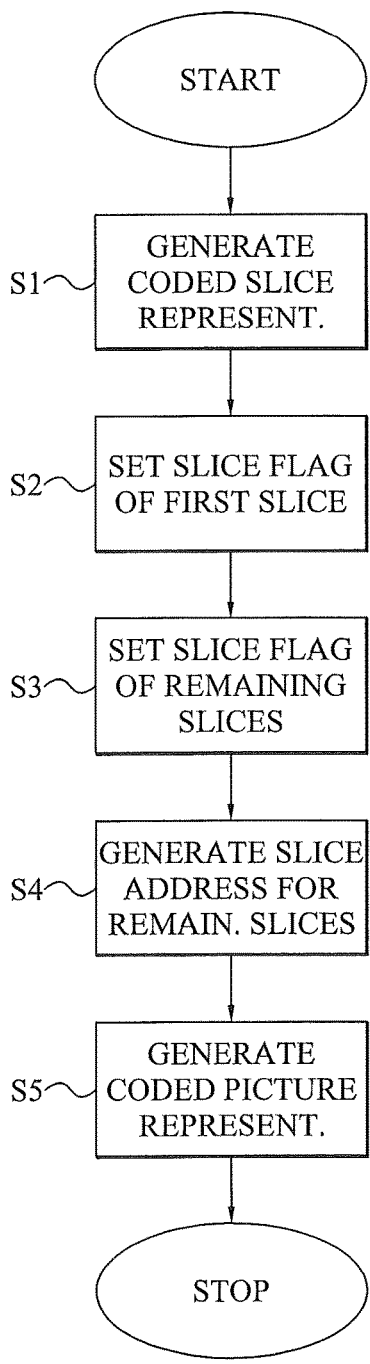
FIG. 1 is a flow diagram illustrating a method of coding a picture according to an embodiment.

FIG. 1 is a flow diagram illustrating a method of coding a picture or video frame comprising N slices. The parameter N is a positive integer equal to or larger than two. The method starts in step S1, which generates a coded slice representation for each slice in the picture. This coded slice representation is generated based on the pixel values of the pixels in the slice according to well known coding schemes, such as intra or inter coding.

The next steps S2 and S3 set so-called slice flags for the slices in the picture. In more detail, step S2 sets a slice flag associated with the first slice of the N slices in the picture to a first defined value, such as $1_{bin}$ or a logical one or some other defined symbol, to indicate that the present slice is the first slice of the picture and thereby has its slice start at a defined position in the picture, typically the upper left corner of the picture. Step S3 correspondingly sets the slice flag associated with each slice of the remaining N−1 slices of the picture to a second defined value, such as $0_{bin}$ or a logical zero or some other defined symbol. This means that the slice flags can be used as additional information in order to differentiate between the first slice in a picture and remaining slices.

These remaining slices need to have associated slice addresses in order to enable the decoder to identify where within the picture area the slice starts. This is not needed for the first slice, which instead has a defined start position within the picture and preferably starts at the first pixel of the picture in the upper left corner. Alternatively, a picture can be divided into regions at a higher level than slices. In such a case, the defined start position could then be the origin of such a region in the picture.

Step S4 therefore generates a slice address for each slice of the remaining N−1 slices, thereby excluding the first slice for which no slice address is required according to the embodiments. The slice address generated in step S4 for a slice allows identification of a position of a first coding unit of the slice and thereby the slice start within the picture. The first coding unit then constitutes the first coding unit of the slice and a preceding, according to a defined processing order, coding unit is then the last coding unit of the preceding slice in the picture. The first coding unit could be any block of pixels and in MPEG-4/AVC the first coding unit is a first macroblock of the slice. Correspondingly, with HEVC the first coding unit could be a LCU but with hierarchical splitting it can advantageously be any coding unit from the LCU size down to a SCU size unless some limitations are imposed of where slice start positions can be found in the picture, which is further discussed herein.

The processing order in which coding units of the picture are processed, i.e. encoded and then subsequently decoded, could be any known processing order. An example of such a processing order is the raster scan order or any other coding/decoding order, such as the Morton or Z order, which is discussed further herein.

The N coded slice representations, the N−1 slice addresses and the N slice flags are then employed to generate a coded picture representation of the picture in step S5. The coded picture representation is typically in the form of a sequence or stream of bits, though other symbol alphabets besides the binary alphabet could be used and are within the scope of the embodiments, such as hexadecimal or decimal alphabet. FIG. 6 is a schematic illustration of an embodiment of such a coded picture representation 50. Generally the coded picture representation 50 comprises two main parts for each slice, a slice header 54 and coded data 56. The slice header 54 typically comprises the slice flag set for the slice in step S2 or S3, such as in the form of the codeword first_slice_in_pic_flag. The slice header 54 of each remaining slice except the first slice in the picture preferably also comprises the slice address generated in step S4, such as in the form of a codeword first_cu_in_slice or the codeword slice_address. In particular embodiments, additional information can be included in the slice header 54 including, for instance, coding type of the slice.

The coded data 56 then carries the coded picture data of the pixels in the slice, i.e. the coded slice representations generated in step S1.

The coded representation 50 may optionally also comprise or otherwise be associated with a picture parameter set (PPS) and/or a sequence parameter set (SPS) 52. The PPS/SPS 52 could form a part of the coded picture representation 50. In such a case, each coded picture representation 50 of a video stream could have a respective PPS and/or SPS field 52. In an alternative approach, not all such coded picture representations 50 of the video stream need to carry the PPS and/or SPS field 52. For instance, the first coded picture representation 50 of the video stream could include the PPS and/or SPS field 52 and then such fields are only included in another coded picture representation of the video stream if any of the parameters in the PPS and/or SPS field 52 are updated or changed. A further variant is to signal the PPS and/or SPS field 52 out of band with regard to the coded picture presentation 50. In such a case, the PPS and/or SPS field 52 could be sent separately from the coded picture representation 50 but in such a way that the decoder is able to identify to which video stream or coded picture representation the PPS and/or SPS field 52 belongs. This can be achieved by including a session, stream and/or picture identifier in both the coded picture representation 50 and in the PPS and/or SPS field 52.

As was mentioned in the foregoing, slices are independently codable and decodable units of the picture. This means that the generation of coded slice representations in step S1, the slice flag setting of steps S2, S3 and the address generation of step S4 can be performed serially or at least partly in parallel for the different slices in the picture. A parallel coding of the slices will typically reduce the total encoding time of the picture. The method of steps S1 to S5 are then typically repeated for any remaining pictures or video frames, such as of a video stream. In addition, step S2 or steps S3/S4 can be performed after, before or at least partly in parallel with step S1.

In the following, embodiments of the present invention will be further described in connection with HEVC as an example of a video encoding and decoding standard to which the embodiments can be applied. This should, however, merely be seen as an illustrative example of picture or video coding/decoding standard that can be used with the embodiments and the embodiments are not limited thereto.

According to HEVC, a picture or video frame comprises multiple LCUs having a selected size in terms of number of pixels. This means that each LCU of the picture preferably has the same number of pixels. The LCUs could be rectangular but are preferably quadratic, i.e. comprises M×M pixels, where M is a defined positive integer equal to or preferably larger than two and preferably $M=2^m$, where m is a positive integer. Non-limiting examples of suitable values of M is 64 or 128. Each LCU of the picture can potentially be hierarchically split into multiple smaller CUs having respective sizes that are smaller than the selected size of the LCU.

Generally, hierarchically splitting a LCU involves splitting the LCU in quadtree fashion. As is well known in the art, a quadtree is a tree data structure in which each internal node has exactly four children. Hierarchically splitting the LCU thereby implies partitioning the two dimensional space of the picture occupied by the LCU by recursively subdividing it into four quadrant or regions. In a preferred embodiment, the recursively splitting involves division into four equally sized CUs. According to the embodiments, if a coding unit, i.e. either LCU or a smaller CU, is split a so-called split coding unit flag associated with the coding unit is set to a defined value, preferably $1_{bin}$ or a logical one or any other defined symbol, indicating that the coding unit is hierarchically split into multiple, preferably four, smaller CUs. Correspondingly, if a splittable coding unit, i.e. a coding unit that is larger than the SCU, is not split a split coding unit flag associated with the coding unit is preferably instead set to $0_{bin}$ or a logical zero or any other defined symbol. "Splittable" coding unit refers herein to a coding unit that is capable of being hierarchically split into multiple, preferably four, smaller coding units. Generally any coding unit except the SCUs is a splittable coding unit. Although a coding unit can be split into smaller coding units it does not have to be split, for instance if such splitting would not improve the coding quality of the picture.

Figure 4:
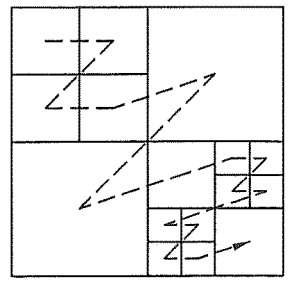
FIG. 4 schematically illustrates an embodiment of a coding and decoding order for processing coding units.

The hierarchical splitting of the embodiments preferably processes LCU per LCU in a defined processing order, such as the raster scan order. The raster scan order is generally from left to right and from top to bottom. Alternatively, a coding/decoding order, such as the Morton or Z order could be used. FIG. 4 illustrates the principles of the Morton order.

If an LCU is split into, preferably four equally sized, CUs, these CUs can then be further processed in a processing order in order to select whether they should be hierarchically split into, preferably four equally sized, even smaller CUs. This processing order could be the same order as when processing the LCUs in the picture. In an alternative approach, the LCUs are processed in the raster scan order with the CUs being processed in the coding/decoding order, such as Morton order. The above presented processing orders are merely examples of orders that can be used and the embodiments are not limited thereto.

Thus, for each coding unit it is determined whether to split the coding unit further into smaller coding units unless the coding unit is the SCU, which cannot be hierarchically split further. Each time a coding unit is split a split coding unit flag associated with the coding unit is preferably set to one and if it is determined that a coding unit is not further split into smaller coding unit its associated split coding unit flag is preferably set to zero. A SCU typically does not need to have any associated split coding unit flag since it cannot be split further.

This decision whether to split a coding unit is based on the coding process. For instance, a picture area that represents a fairly homogenous background is more efficiently represented using large CU sizes, such as LCUs, as compared to splitting the picture area into smaller coding units. However, picture areas with small details or a lot of such details can generally not be correctly represented if using large coding units. In such a case, it is more efficient and preferred from coding quality point of view to use several smaller CUs for the picture area. The selection of whether to further split a CU can thereby performed according to techniques described in the art and preferably based on the coding efficiency and quality.

The split coding unit flags generated during the encoding of the slices in step S1 of FIG. 1 are typically included in the coded data portion 56 of the coded picture representation 50 as illustrated in FIG. 6.

FIG. 5 is a flow diagram illustrating additional steps of the coding method of FIG. 1. The method starts in the optional step S10 where a hierarchical granularity is determined for the picture. The hierarchical granularity defines a hierarchical level for slice border alignments within the picture. This hierarchical level defines and limits the size of a smallest possible addressable coding unit at which a start of a slice in the picture can be aligned. The hierarchical level and the determined hierarchical granularity thereby define the maximum number of slice start positions that are potentially available in the picture and at which a slice start can be positioned. This means that the hierarchical granularity defines the number of addressable CUs within the picture, where the start of a slice can be aligned between the border of such an addressable CU and a previous, according to a defined processing order, CU in the picture.

For instance, an LCU having a selected size of 64×64 pixels could have a slice granularity defining a granularity level of 0 to 3 with an SCU size of 8×8 pixel. In such a case, a granularity level of 0 indicates that slice starts can only be aligned with borders between LCUs. With a picture of 1280×960 pixels this implies 20×15=300 possible slice start positions. If the granularity level instead is 1, the smallest possible coding unit at which a slice start can be aligned is instead 32×32 pixels with a total of 40×30=1200 possible slice start positions. Correspondingly, a granularity level of 2 means that there are 80×60=4800 possible slice start positions since the slice starts can be aligned with CUs of 16×16 pixels or larger. Finally, a granularity level of 3 indicates that slice starts can be aligned with the SCU borders giving a total of 160×120=19200 possible slice start positions.

A reason why one would like to have the possibility to select between these cases of from 220 up to 14400 possible slice start positions in the present example is that the more slice start positions that are available in the picture the longer slice addresses are needed, thereby increasing the overhead of the coded picture data. Thus, if there are no specific demands on target slice sizes, such as fitting the slice data in a single IP data packet, it could be advantageous to limit the number of slice start positions in a picture to thereby reduce the amount of address data that needs to be generated and transmitted to the decoder.

A next step S11 determines the length of the slice address for the N−1 slices in the picture, where the length is in terms of the number of bits or other symbols of the slice address. The length of the slice address is dependent on the number of potential slice start positions and the number of addressable coding units within the picture. In the case of MPEG-4/AVC this number of slice start positions depends on the size of the picture since slice starts can only be aligned at macroblock borders. This means that given the total size of the picture, the number of possible slice start positions can be calculated given the fixed macroblock size. The length of the slice address can then be calculated from this number, such as $\log_2(P)$ or $\log_2(P-1)$, where P represents the number of possible slice start positions and thereby the total number of possible slice addresses in the picture. The size of the picture is typically included in a header field associated with the coded picture representations or could be found in the previously mentioned PPS or SPS field 52 of or associated with the coded picture representation 50, see FIG. 6.

In HEVC, the length of the slice address is preferably determined in step S11 based on the hierarchical granularity determined in step S10 for the picture. The hierarchical granularity can then be used to define the size of the addressable coding units and thereby smallest possible coding unit size at which a slice start can be aligned. This granularity information is preferably employed together with information of the size of the picture or of the total number of LCUs in the picture, in order to determine the length of the slice address in step S11.

In an embodiment, the size of the LCUs in the picture could be predefined and thereby known to the encoder and the decoder. For instance, the LCU size could be 128×128 pixels or 64×64 pixels. No determination or signaling of the LCU size is thereby needed. Correspondingly, the size of the SCUs in the picture could be predefined. Examples of such fixed and predefined SCU sizes that can be employed are 16×16 pixels or 8×8 pixels.

In alternative embodiments, the encoding process may additionally determine the LCU size and/or the SCU size to employ for the current picture(s). This could be beneficial to thereby adapt these LCU and/or SCU sizes to the particular characteristics of the present picture. For instance, for some pictures being basically a uniform homogenous background view larger LCU and SCU sizes could be preferred and leading to more efficient coding as compared to pictures with a lot of small details where smaller LCU and SCU sizes could be preferred.

In an embodiment, the LCU size and/or the SCU size are therefore determined during the encoding, such as based on the pixel values of the picture. A notification of the determined LCU size and/or a notification of the determined SCU size is then associated with the coded picture representation. The association of the notification(s) and the coded picture representation can be conducted according to various embodiments. For instance, the notifications can be included in the coded picture representation. An alternative is to include the notifications in the PPS or SFS.

The SCU size could then be defined based on the parameter log2_min_coding_block_size_minus3 and preferably by calculating the parameter Log 2MinCUSize as Log 2MinCUSize=log2_min_coding_block_size_minus3+3.
This parameter Log 2MinCUSize is then employed as SCU size representation and gives the SCU size MinCUSize= (1<<Log 2MinCUSize), where << denotes a left shift operator. Depending on the value of the parameter Log 2MinCUSize and thereby on the parameter log2_min_coding_block_size_minus3 the SCU size could then be 8 or 16 as illustrative examples.

The LCU size is preferably determined relative the SCU size by defining the parameter log2_diff_max_min_coding_block_size. In more detail, the parameter Log 2MaxCUSize is calculated as Log 2MaxCUSize=log2_min_coding_block_size_minus3+3+ log2_diff_max_min_coding_block_size. This parameter Log 2MaxCUSize is then employed as LCU size representation and gives the LCU size MaxCUSize=(1<<Log 2MaxCUSize). Depending on the value of the parameter Log 2MaxCUSize and thereby on the parameters log2_min_coding_block_size_minus3 and log2_diff_max_min_coding_block_size the LCU size could then be 64 or 128 as illustrative examples.

The notifications of the SCU size and the LCU size could thereby be the parameters log2_min_coding_block_size_minus3 and log2_diff_max_min_coding_block_size.

In an alternative embodiment, the LCU size is not determined relative the SCU size. This means that that no SCU parameter is needed to determine the LCU size.

The slice address generated for each slice except the first slice in the picture could define the position of the slice start and the first CU of the slice as a simple number. The different possible slice start positions and addressable coding units are then numbered from zero and upwards. For instance, a 1280×960 pixels picture has 4800 unique slice start positions if the hierarchical granularity defines that the size of the smallest possible coding unit at which a slice start in the picture can be aligned is 16×16 pixel. These positions could then be numbered from 0 up to 4799, thereby requiring 13-bit slice addresses.

An alternative is to handle the X and Y coordinates separately. With the above example, the X coordinate is from 0 to 79 and the Y coordinate is from 0 to 59, thereby requiring 7 plus 6 bits for the slice addresses.

A further alternative is to determine the slice address so that LCU coordinates and sub-LOU coordinates can be retrieved therefrom. In such a case, the coordinates of a position of a LCU within the picture is determined for a slice. The slice start and the first CU of the slice are then positioned in the picture inside this LOU. The coordinates are then in relation to a global origin or start point, typically the upper left corner of the picture. The LCU coordinates could then be the coordinates of the LCU in relation to this global origin, such as in terms of a LCU number or in terms of X and Y coordinates as mentioned above. The coordinates of the position of the first CU and thereby the slice start within the LCU are also determined. These coordinates are then relative a local origin or start point, typically the upper left corner of the LCU. These sub-LCU coordinates could also be in the form of a number or in terms of X and Y coordinates.

The slice address is then generated based on the LCU coordinates and sub-LCU coordinates and the hierarchical granularity. The hierarchical granularity is employed when defining the sub-LCU coordinates by restricting and defining the possible start positions for the slice and the first CU of the slice within the LCU.

In an embodiment, a first or LCU representation is generated based on the determined LCU coordinates and a second or sub-LCU representation is generated based on the sub-LCU coordinates. The slice address could then comprise these two representations. Alternatively, the slice address is generated in such a way that the LCU coordinates and the sub-LCU coordinates can be determined or calculated from the slice address.

Deriving the LCU and sub-LCU coordinates could be performed according to below as a non-limiting but illustrative example.

The hierarchical granularity determined in step S10 is defined by the codeword slice_granularity. Slice_granularity is typically a 2-bit value ranging from $00_{bin}=0$ up to a maximum of $11_{bin}=3$. This enables four different hierarchical levels. If merely two such hierarchical levels are needed slice_granularity could instead by a 1-bit value. Correspondingly, for more than four hierarchical levels a 3-bit or longer slice_granularity parameter is needed. Alternatively, variable length coding is possible for signaling the hierarchical granularity.

The slice_granularity codeword is optionally defined to not be larger than the minimum of two other codewords determined during encoding of the picture or video stream: Log 2MaxCUSize-4 and log2_diff_max_min_coding_block_size. The codeword slice_granularity is then, during decoding, employed to calculate the parameter SliceGranularity as SliceGranularity=(slice_granularity<<1).

The slice address generated during encoding is the codeword slice_address. This codeword defines the slice address in slice granularity resolution in which the slice starts. The length of the slice address, i.e. slice_address, is as mentioned above determined based on the hierarchical granularity. In a particular embodiment, the length of the slice_address in terms of number of bits is equal to ceil(log$_2$(NumLCUsInPicture)+SliceGranularity).

The parameter NumLCUsInPicture defines the total number of LCUs in the picture and is determined based on the size of the picture and based on the size of the LCUs, which is either fixed or determined as mentioned in the foregoing. NumLCUsInPicture can then be included in the coded picture representation or be associated thereto, such as in a PPS or SPS field. Alternatively, a decoder is able to itself calculate the parameter NumLCUsInPicture based on the LCU size (log2_min_coding_block_size_minus3 and log2_diff_max_min_coding_block_size) and the total size of the picture, which is signaled to the decoder in or associated with the coded picture representation.

The LCU part of the slice address according to a processing order, such as raster scan order, is then defined as LCUAddress=(slice_address>>SliceGranularity), where >> denotes a right shift operator. The sub-LCU part of the slice address according to a processing order, such as Morton order, is calculated as GranularityAddress=slice_address−(LCUAddress<<SliceGranularity).

The slice address is then determined based on the LCUAddress and the GranularityAddress as SliceAddress=(LCUAddress<<(log2_diff_max_min_coding_block_size<<1))+(GranularityAddress<<((log2_diff_max_min_coding_block_size<<1)−SliceGranularity)).

The slice address generated for the remaining slices excluding the first slice in the picture could be a fixed length address, where the length of the address is fixed for a picture and depends on the size of a smallest possible coding unit at which a start of a slice in the picture can be aligned and the total size of the picture. An alternative would be to use a variable length representation. An example of a variable length code that can be used is the universal variable length coding (UVLC) as mentioned in Lee and Kuo, Complexity Modeling of H.264/AVC CAVLC/UVLC Entropy Decoders, IEEE International Symposium on Circuits and Systems (ISCAS2008), 2008, pp. 1616-1619. Briefly, UVLC uses Exp-Golomb (EG) code. The EG code for an unsigned integer value C is [P zeros][1][info], where P=floor(log$_2$(C+1)) and info=C+1−2$^P$.

The slice address not only defines the position of the first CU and thereby the start of a slice but additionally defines the size of the largest possible CU that can occupy the position in the picture defined by the slice address. This means that this size is dependent on the position as determined by the slice address. Though, the slice address gives the size of the largest possible CU that can occupy the position, the size of the first CU does not need to be equal to the size of this largest possible CU that can occupy the position. FIGS. 3A and 3B illustrate this concept. In the figures reference numbers 2, 3 denote two different slices in a picture and the bold line defines the border between the two slices 2, 3. The slice border occurs in these examples within the area of the picture occupied by a LCU 10. Reference number 20 denotes a CU obtained for a granularity of 1 when the LCU 10 is hierarchically split into four CUs 20. With a granularity of 2 this CU 20 can be hierarchically split into four smaller CUs 30. In FIGS. 3A and 3B showing a case with a granularity of 3 a CU 30 can be split into four SCUs 40.

In FIG. 3A the first CU of the slice 3 is referenced by 30, whereas in FIG. 3B it is referenced by 40B. The reference numbers 40 (FIG. 3A) and 40A (FIG. 3B) denote a preceding CU of the LCU 10 according to the defined processing order, which in this example is the Morton order. In both FIGS. 3A and 3B the start of the slice and the position of the first CU 30, 40B are the same though the first CU 30, 40B have different sizes in the two examples. The slice address is, however, typically the same in both these cases and the size of the largest possible CU 30 that can occupy the relevant position is the same. The two cases can be differentiated by complementing the slice address with additional information in terms of so-called split coding unit flags.

Figure 7:
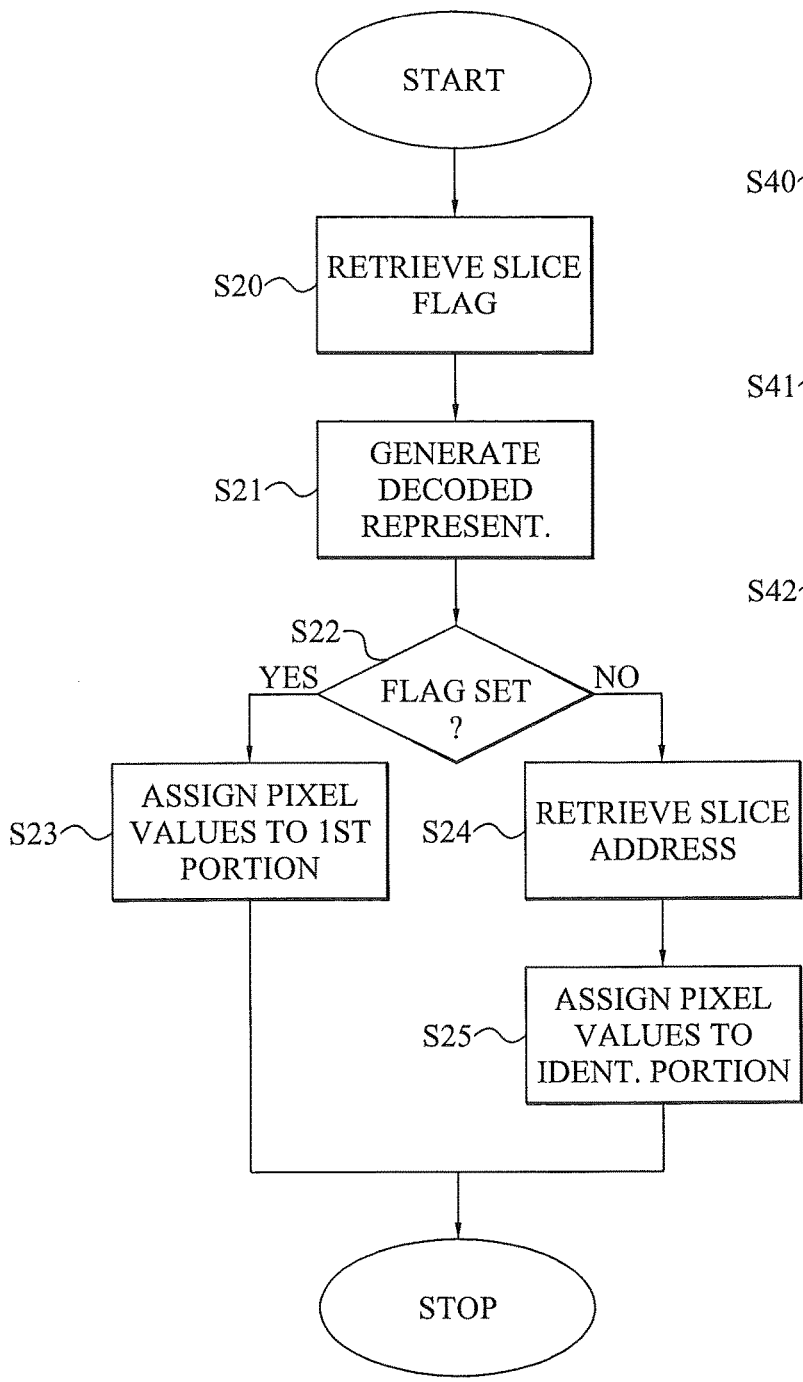
FIG. 7 is a flow diagram illustrating an embodiment of decoding a coded representation of a picture.

In an example, assume that the size of a LCU is 128×128 pixels and a corresponding size of a SCU is 16×16 pixels. Further assume that the LCUs 10 of FIGS. 3A and 3B consists of two slices 2, 3 then the coded representation could be defined as:

Slice_header_syntax( )//slice 2 in FIG. 3A—includes the address information split_coding_unit_flag=1//split 128×128 LCU into four 64×64 CUs split_coding_unit_flag=0//first 64×64 CU is not split further code of first 64×64 CU//the coded representation of the pixel values of the first 64×64 CU split_coding_unit_flag=1//split second 64×64 CU into four 32×32 CUs split_coding_unit_flag=0//first 32×32 CU is not split further
    code of first 32×32 CU//the coded representation of the pixel values of the first 32×32 CU
split_coding_unit_flag=1//split second 32×32 CU into four SCUs, no further split coding unit flags are needed
    code of first SCU//the coded representation of the pixel values of the first SCU
    code of second SCU//the coded representation of the pixel values of the second SCU
    code of third SCU//the coded representation of the pixel values of the third SCU
    code of fourth SCU//the coded representation of the pixel values of the fourth SCU
split_coding_unit_flag=1//split third 32×32 CU into four SCUs, no further split coding unit flags are needed
    code of first SCU//the coded representation of the pixel values of the first SCU
    code of second SCU//the coded representation of the pixel values of the second SCU
    code of third SCU//the coded representation of the pixel values of the third SCU
    code of fourth SCU//the coded representation of the pixel values of the fourth SCU
split_coding_unit_flag=1//split fourth 32×32 CU into four SCUs, no further split coding unit flags are needed
    code of first SCU//the coded representation of the pixel values of the first SCU
    code of second SCU//the coded representation of the pixel values of the second SCU
    code of third SCU//the coded representation of the pixel values of the third SCU
    code of fourth SCU//the coded representation of the pixel values of the fourth SCU
split_coding_unit_flag=1//split third 64×64 CU into four 32×32 CUs
split_coding_unit_flag=1//split first 32×32 CU into four SCUs, no further split coding unit flags are needed
    code of first SCU//the coded representation of the pixel values of the first SCU
    code of second SCU//the coded representation of the pixel values of the second SCU
    code of third SCU//the coded representation of the pixel values of the third SCU
    code of fourth SCU//the coded representation of the pixel values of preceding CU 40 in FIG. 3A
Slice_header_syntax( )//slice 3 in FIG. 3A—includes the address information
split_coding_unit_flag=0//split coding unit flag of first CU is set to zero since the size of the first CU is equal to the size of the largest possible CU that can occupy the position in the picture defined by the generated address information. —The largest possible CU at this address is 32×32 and no split flags splitting down to 32×32 are needed, Instead the size 32×32 is derived from the address and the granularity.
    code of first CU//the coded representation of the pixel values of the CU 30 in FIG. 3A
split_coding_unit_flag=1//split 32×32 CU into four SCUs, no further split coding unit flags are needed
    code of first SCU//the coded representation of the pixel values of the first SCU
    code of second SCU//the coded representation of the pixel values of the second SCU
    code of third SCU//the coded representation of the pixel values of the third SCU
    code of fourth SCU//the coded representation of the pixel values of the fourth SCU
split_coding_unit_flag=1//split 32×32 CU into four SCUs, no further split coding unit flags are needed
    code of first SCU//the coded representation of the pixel values of the first SCU
    code of second SCU//the coded representation of the pixel values of the second SCU
    code of third SCU//the coded representation of the pixel values of the third SCU
    code of fourth SCU//the coded representation of the pixel values of the fourth SCU
split_coding_unit_flag=0//no further split of 64×64 CU
code of 64×64 CU//the coded representation of the pixel values of the first 64×64 CU In the embodiment illustrated in FIG. 3B the code for the first slice 2 would be the same as above, whereas for the second slice 3 the code would instead become:

Slice_header_syntax( )//slice 3 in FIG. 3B—includes the address information
split_coding_unit_flag=1//split coding unit flag of first CU is set to one since the size of the first CU is smaller than the size of the largest possible CU that can occupy the position in the picture defined by the generated address information, no further split coding unit flags are needed.
    code of first CU//the coded representation of the pixel values of the first CU 40B in FIG. 3B
    code of second SCU//the coded representation of the pixel values of the second SCU
    code of third SCU//the coded representation of the pixel values of the third SCU
    code of fourth SCU//the coded representation of the pixel values of the fourth SCU
split_coding_unit_flag=1//split 32×32 CU into four SCUs, no further split coding unit flags are needed
    code of first SCU//the coded representation of the pixel values of the first SCU
    code of second SCU//the coded representation of the pixel values of the second SCU
    code of third SCU//the coded representation of the pixel values of the third SCU
    code of fourth SCU//the coded representation of the pixel values of the fourth SCU
split_coding_unit_flag=1//split 32×32 CU into four SCUs, no further split coding unit flags are needed
    code of first SCU//the coded representation of the pixel values of the first SCU
    code of second SCU//the coded representation of the pixel values of the second SCU
    code of third SCU//the coded representation of the pixel values of the third SCU
    code of fourth SCU//the coded representation of the pixel values of the fourth SCU
split_coding_unit_flag=0//no further split of 64×64 CU
code of 64×64 CU//the coded representation of the pixel values of the first 64×64 CU FIG. 7 is a flow diagram illustrating a method of decoding a coded picture representation of a picture comprising multiple slices. The method starts in step S20, where a slice flag associated with a slice is retrieved from the coded picture presentation, preferably from a slice header assigned to the current slice in the coded picture presentation. A next step S21 generates a decoded representation of pixel values of the pixels in the slice based on a coded slice representation associated with the slice and retrieved from the coded picture representation, typically from the coded data portion thereof. The decoded representations of the pixel values are generated according to well known decoding techniques, such as inter- or intra-mode decoding.

Pixel value as used herein denotes any value of a pixel property assigned to a pixel. In typical implementations for HEVC the pixel value is a color value. Different color formats are known in the art and can be used according to the embodiments. For instance, a color value could comprise both luminance and chrominance components, typically one luminance value and two chrominance components. A pixel value could therefore be a luminance value of a pixel, a chrominance value of a pixel or indeed both luminance and chrominance values. Another example of a common color format is the so-called RGB format, which stands for Red-Green-Blue. A color value then comprises both a red, green and blue value, A pixel value could then be a RGB value, a red value, a green value or a blue value. Also variants of the RGB format, such as RGBA are known and can be used according to the embodiments.

In fact, the embodiments do not necessarily have to be limited to usage of color values as pixel values but can also be applied to other known pixel values including grayscale values, normal values, i.e. X, Y, Z coordinate values, etc.

The slice flag retrieved in step S20 is then employed in step S22 in order to determine whether the current slice is the first slice in the picture and thereby does not have any associated slice address or whether the current slice is not the first slice and therefore a slice address is required for the slice.

If step S22 determines that the current slice is indeed the first slice, e.g. when the slice flag has a value of one, the method continues to step S23. Step S23 simply assigns the pixel values generated in step S21 to a first portion of the picture starting with the defined slice start in the picture, typically the upper left corner of the picture. The pixel values are typically assigned to the pixels in a defined processing order, such as the previously mentioned Morton or raster scan order. In a typical embodiment applied to HEVC, coding units smaller than the LCU are processed in the Morton order whereas the LCUs of the picture are processed in the raster scan order. This implies that the decoding starts with the first LCU of the slice and then if this LCU is split into smaller CUs these smaller CUs are decoded in the Morton order. Once the LCU has been decoded the process continues with the next LCU according to the raster scan order and any smaller CUs of this next LCU are decoded in the Morton order.

In a particular embodiment, step S22 is in fact performed prior to step S21 in order to determine that the present slice is indeed the first slice in the picture. Then coded data of the coded picture presentation belonging to the current slice is decoded and assigned to pixels coding unit per coding unit. This means that steps S21 and S23 then form a loop which proceed through the different CUs of the slice and decode each CU one by one and assigns the pixel value to the pixels CU per CU according to the above mentioned processing order.

If step S22 instead determines that the present slice is not the first slice of the picture based on the value of the associated slice flag, such as having a value of zero, the method continues to step S24. Step S24 retrieves the slice address for the slice from the coded picture presentation, typically from the slice header of the slice. The slice address is employed in order to identify the start of the slice within the picture and thereby the portion of the picture that belongs to the slice. A next step S25 then assigns pixel values to the pixels in the identified portion of the picture to thereby generate a decoded slice.

In similarity to steps S21 and S23 above, steps S22 and S24 can be performed prior to steps S21 and S25 to thereby first conclude that the present slice is not the first one and then identify and read the slice address from the coded picture representation. Thereafter the start of the slice is identified based on the slice address and decoding of the coded data for the slice can be started. The decoding can proceed CU per CU and then assign the decoded pixel values to the pixels in the current CU before continuing to the next CU according to the processing order.

In an alternative approach step S22 is performed prior to step S21. Thus, steps S22 investigates whether the slice flag is set or not and then proceed by generating the decoded representation of the pixel values and assigns as indicated in step S23 or first retrieves and uses the address information in step S24 in order to identify which portion of the picture to assign the pixel values to in step S25.

Once all coded data of a slice has been decoded and assigned to the pixel portion identified for the slice in step S23 or S25 the method ends or proceeds further to a next slice of the present picture to another slice of another picture in a video stream. In such a case, the method of FIG. 7 is repeated for this next or another slice.

However, in preferred embodiments that reduce the total decoding time of a picture, multiple slices can be decoded in parallel. In such a case, the method of FIG. 7 is performed for each of these slices and a decision of step S22 is therefore conducted for each of the slices based on the respective slice flag of the slice to be decoded.

FIG. 8 is a flow diagram illustrating additional steps of the method in FIG. 7. The method continues from step S22 of FIG. 7, which concluded that the present slice is not the first slice in the picture based on its associated slice flag. A next step S30 retrieves information of the hierarchical granularity for the coded picture representation. As previously discussed herein, the granularity information can be included in the coded picture representation and is then retrieved therefrom in step S30. Alternatively, the granularity information can have been included in a previously received coded picture representation relating to a same video stream. In such a case, the granularity information is retrieved therefrom and stored for later use when decoding following coded picture representations. The granularity information could also have been sent separate from any coded picture representation, such as a separate PPS or SPS field. Session, picture or stream identifiers could then be used to identify the relevant granularity information for the present coded picture representation.

A next optional step S31 retrieves information of the number of LCUs in the present picture. This information could simply identify the number of such LCUs or could be used by the decoder to calculate the number of LCUs. For instance, the codeword NumLCUsInPicture could be retrieved from the coded picture representation or from global header information, such as PPS or SPS fields. Alternatively, NumLCUsInPicture is calculated based on information of the total size of the picture, as retrieved from the coded picture representation or from the global header, and information of the LCU size, e.g. the previously mentioned log2_min_coding_block_size_minus3 and log2_diff_max_min_coding_block_size codewords.

A next step S32 determines the length of the slice address of the current slice based on the information of the hierarchical granularity and preferably based on the number of LCUs in the picture. In a particular embodiment, the length of the slice address is defined as ceil($\log_2$(NumLCUsInPicture)+SliceGranularity). Thus, in a particular embodiment the length of the slice address is determined based on the information of the hierarchical granularity and based on information of the number of LCUs in the current picture. The parameter SliceGranularity is preferably obtained directly from the granularity information slice_granularity as SliceGranularity=(slice_granularity<<1).

The method then continues to step S24 of FIG. 7, where the slice address of the current slice is retrieved from the coded picture presentation based on information of the length of the slice address as determined in step S32. Thus, this length is employed in order to identify which bits or symbols of the coded picture representation that defines the slice address by defining the length of the slice address, which preferably has a fixed start point in the slice header of the slice but where the end point depends on the slice address length.

In the case the present embodiments are applied on top of H.264/MPEG-4 AVC no granularity information is available and step S30 can thereby be omitted. Step S31 retrieves information of or allowing determination of the number of macroblocks in the picture and where this information is employed in step S32 in order to determine the length of the slice address.

Figure 9:
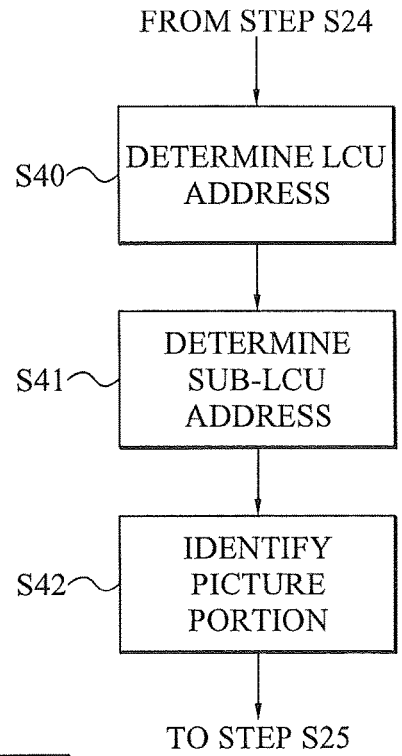
FIG. 9 is a flow diagram illustrating additional steps of the method in FIG. 7 according to an embodiment.

FIG. 9 is a flow diagram illustrating a particular embodiment of identifying the position of the first coding unit of the slice and thereby the slice start within the picture. The method continues from step S24 of FIG. 7. A next step S40 determines an LCU address representing a position of an LCU within the picture in which the first CU and the slice start is present. Step S40 employs the slice address in order to determine the LCU address. For instance, the parameter LCUAddress can be determined as slice_address>>SliceGranularity, where slice_address represents the slice address. A next step S41 correspondingly determines a sub-LCU address representing a position of the first CU within the LCU identified in step S40. This sub-LCU address is also determined based on the slice address. For instance, the parameter GranularityAddress is determined as slice_address−(LCUAddress<<SliceGranularity).

The LCU and sub-LCU parts can then be employed to calculate the final slice address as (LCUAddress<<log2_diff_max_min_coding_block_size<<1))+(GranularityAddress<<((log2_diff_max_min_coding_block_size<<1)−SliceGranularity)) that is employed in step S42 in order to identify the portion of the picture that belongs to the present slice. Thus, this portion starts with the slice start and the first CU identified based on the slice address and then continues according to the processing order through the picture until all coded data of the slice have been decoded and assigned to CUs of the picture.

In alternative embodiments, the slice address retrieved from the coded picture representation is employed directly to identify the slice start and the first coding unit. The slice address could then correspond to the number of slice start positions or addressable CUs at which the slice is started. The slice address can then be an index in a list of all possible addresses in coding/decoding order. Alternatively, X and Y coordinates are derived from slice address and employed to locate the slice start. A further variant is to retrieve or calculate from the slice address LCU coordinates and sub-LCU coordinates as previously described herein.

The slice address not only defines the position of the first CU of the slice and the slice start but preferably also defines the size of the first CU. Thus, the size of the first CU is determined based at least partly on the slice address. In more detail, the slice address dictates the largest possible size in terms of number of pixels that the first CU can have. This means that the first CU can have a size equal to this largest possible size or a size smaller than the largest possible size. In the latter case, a split coding unit flag is further employed in addition to the slice address in order to define the correct size of the first CU, which is further discussed herein.

For instance, the first CU can be associated with a split coding unit flag included in the coded picture representation, typically in the coded data portion. The value of the split coding unit flag is then employed together with the slice address in order to define the correct size of the first CU. Thus, if the split coding unit flag is set to a defined value, preferably one, the size of the first CU is smaller than the size of the largest possible CU that can occupy the position within the picture defined based on the slice address, see FIG. 3B. However, if the split coding unit flag is set to another defined value, preferably zero, the size of the first CU is equal to the size of the largest possible CU that can occupy the position in the picture defined by the slice address, see FIG. 3A.

It is possible that the first CU is associated with multiple split coding unit flags. For instance, if the size of the largest possible CU is 32×32 pixels, whereas the size of the first CU is 8×8 pixels with a LCU size and SCU size of 64×64 pixels and 8×8 pixels, the code would be:

split_coding_unit_flag=1//32×32 CU is divided into 16×16 CUs split_coding_unit_flag=1//first 16×16 CU is split into SCUs, no further split coding unit flag is needed since we have now reached the target size of the first CU and this is also the SCU size implying that now further splitting is possible In some embodiments, the size of the first CU can be determined solely based on the slice address without using any split coding unit flag as additional information. This is possible when the size of the largest possible CU that can occupy the position within the picture defined based on the slice address is equal to the SCU size. In such a case, it is not possible to split this largest possible CU further since it is in fact a SCU.

FIG. 10 is a schematic block diagram of an encoder or device 100 for coding a picture comprising multiple slices. The device 100 comprises a representation generator 110 configured to generate a respective coded slice representation for each slice in the picture based on the pixel values of the pixels in the slice. The representation generator 110 performs this pixel coding according to known coding schemes, such as inter or intra coding. A flag setter 120 of the device 100 is configured to set a slice flag associated with the slice. If the present slice is the first slice in the picture, the flag setter 120 sets the slice flag to a first defined value, such as one, whereas for the remaining slice(s) in the picture the respective slice flag is set to a second defined value, such as zero.

An address generator 130 generates a respective slice address for each slice except the first slice in the picture, i.e. for each slice with a slice flag set to zero. The slice address generated by the address generator 130 allows identification of a position of a first CU of the slice within the picture and thereby the start position of the slice within the picture.

The device 100 also comprises a representation manager 140 configured to include the respective coded slice representations from the representation generator 110, the slice flags from the flag setter 120 and the slice address(es) from the slice address generator 130 in a coded picture representation of the picture. In a particular embodiment, the slice flag is provided in the coded representation prior to the slice address(es). In such a case, parsing is possible since the slice flag decides whether there is a slice address field or not in the coded slice representation.

In an embodiment, the address generator 130 generates the slice address based on the hierarchical granularity determined for the picture by the device 100. In such a case, an optional length determiner 150 can be implemented in the device 100 to employ the hierarchical granularity in order to determine the length of the slice address and thereby the number of bits that the slice address should contain. The length determiner 150 additionally preferably also uses information of the total number of LCUs in the picture when determining the length of the slice address, where this total number of LCUs can be calculated as previously disclosed herein. In another embodiment, the length determiner 150 is omitted and the address generator 130 itself determines the length of the slice address.

In the case of H.264/MPEG-4 AVC coding, the length determiner 150 preferably determines the length of the slice address based on the number of macroblocks in the picture, which can be calculated based on information of the total size of the picture.

The address generator 130 then uses this information of the length when generating the slice address. In a particular embodiment, the address generator 130 determines the coordinates of a LCU position within the picture and coordinates of a sub-LCU position within the LCU as previously disclosed herein. The slice address could then comprise representations of the representations of these LCU and sub-LCU positions or be determined therefrom.

The device 100 is advantageously employed in order to encode multiple slices in parallel in order to reduce the total encoding time of a picture and of a video stream.

The device 100 could be implemented at least partly in software. In such an embodiment, the device 100 is implemented as a computer program product stored on a memory and loaded and run on a general purpose or specially adapted computer, processor or microprocessor, such as a central processing unit (CPU). The software includes computer program code elements or software code portions effectuating the operation of at least the representation generator 110, the flag setter 120, the address generator 130, the representation manager 140 and the optional length determiner 150. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks. A non-limiting example of program code used to define the device 100 include single instruction multiple data (SIMD) code.

Alternatively the device 100 can be implemented in hardware. There are numerous variants of circuitry elements that can be used and combined to achieve the functions of the units of the device 100. Such variants are encompassed by the embodiments. Particular examples of hardware implementation of the device 100 is implementation in digital signal processor (DSP) hardware and integrated circuit technology, including both general-purpose electronic circuitry and application-specific circuitry.

FIG. 11 is a schematic block diagram of an embodiment of a decoder or device 200 for decoding a coded representation of a picture comprising multiple slices. The device 200 comprises a representation retriever 210 configured to retrieve a slice flag associated with a slice to be decoded from the coded picture representation, typically from a slice header in the coded picture representation. A representation generator 220 is provided in the device 200 to generate a decoded representation of the pixel values of the pixels in the slice based on the coded picture representation. The representation generator 220 generates the pixel values according to known techniques, such as intra or inter mode decoding schemes.

An address retriever 230 becomes operable if the slice flag retrieved for a current slice by the representation retriever 210 has a second defined value, such as zero, indicating that the slice is not the first slice in the picture. The address retriever 230 then reads and retrieves a slice address associated with the slice from the coded picture representation, such as from a slice header in the coded picture representation. A value assigner 240 then assigns pixel values obtained from the representation generator 220 as the slice is decoded to pixels in a portion of the slice identified based on the slice address retrieved by the address retriever 230.

If the slice flag retrieved by the representation retriever for a current slice has a first defined value, such as one, the value assigner 240 can directly identify the portion of the slice to which pixel values from the representation generator 220 should be assigned. This is generally the first part of the picture in the coding/decoding order, such as top left portion. Thus, in such a case no slice address is needed in order to identify this first portion of the picture.

In the case of a HEVC implementation and if hierarchical granularity information is assigned to the coded picture data, an optional granularity information retriever 250 can be provided in the device 200 to retrieve information of a hierarchical granularity applicable to a present slice to be decoded. The granularity information retriever 250 could retrieve the granularity information from the coded picture representation or from a global header field, such as PPS or SPS field, associated with the coded picture representation. The granularity information retrieved by the granularity information retriever 250 is employed by an optional length determiner 260 to determine the length of the slice address and thereby determine the number of bits that the address retriever 230 should read in order to retrieve the slice address. Alternatively, this length determiner 260 can be omitted and the address retriever 230 itself determines the address length based on the granularity information.

An optional coding unit information retriever 270 is advantageous implemented in the device 200 in order to retrieve information of a total number of LCUs in the picture from the coded picture representation, such as from a global header field, PPS or SPS field. This information could be the previously mentioned log2_min_coding_block_size_minus3 and log2_diff_max_min_coding_block_size, which allow the coding unit information retriever 270 to calculate the number of LCUs in the picture given information of the total size of the picture, which is preferably also available from the coded picture representation or from a global header filed, PPS or SPS field.

The length determiner 260 then advantageously determines the length of the slice address based on the granularity information from the granularity information retriever 250 and the total number of LCUs as determined by the coding unit information retriever 270.

In an embodiment, the address retriever 230 is configured to determine a first representation or LCU address of the coordinates of a position of a LCU within the picture based on the slice address if the current slice is not the first slice in the picture. The address retriever 230 preferably also determines a second representation or sub-LCU address of the coordinates of a position of a first coding unit of the slice and thereby the slice start within the LCU. The LCU address and the sub-LCU are then employed by the address retriever 230 to identify the portion of the picture that belongs to the current slice based on the LCU address and the sub-LCU address as disclosed herein.

For instance, the address retriever 230 can determine the parameter LCUAddress=slice_address>>SliceGranularity based on the slice address (slice_address) and based on information of the hierarchical granularity (SliceGranularity). The sub-LCU address is preferably determines as GranularityAddress=slice_address−(LCUAddress<<SliceGranularity) based on the slice address (slice_address), the information of the hierarchical granularity (SliceGranularity) and the LCU address.

The representation generator 220 preferably determines the size of the first CU in the slice in terms of number of pixels based at least partly on the slice address. The slice address then defines the size of the largest possible CU that can occupy the position defined by the slice address in the picture. In an embodiment, the size of the first CU is determined by the representation generator 220 based solely on the slice address. This is possible when the size of the first CU is equal to the SCU size and no further CU splitting is possible. In other embodiments, the representation generator 220 additionally uses one or more split coding unit flags included in the coded picture representation together with the slice address to determine the size of the first CU. If a single split coding unit flag is equal zero or some other defined value, the size of the first CU is equal to the size of the largest CU that can occupy the position within the picture defined by the slice address. If the split coding unit flag is instead equal to one or some other defined value, the size of the first CU is smaller than, preferably one quarter of, the size of the largest possible CU that can occupy the position within the picture defined by the slice address.

For instance, if the size of the largest possible CU at the starting coordinate is 32×32 pixels (with a LCU size of 64×64 pixels and a SCU size of 8×8 pixels) the split coding unit flag(s) would be:

split_coding_unit_flag=0
for a 32×32 pixels size of the first CU
split_coding_unit_flag=1
split_coding_unit_flag=0
for a 16×16 pixels size of the first CU
split_coding_unit_flag=1
split_coding_unit_flag=1
for an 8×8 pixels size of the first CU The device 200 could be implemented at least partly in software. In such an embodiment, the device 200 is implemented as a computer program product stored on a memory and loaded and run on a general purpose or specially adapted computer, processor or microprocessor, such as a central processing unit (CPU). The software includes computer program code elements or software code portions effectuating the operation of at least the representation retriever 210, the representation generator 220, the address retriever 230, the value assigner 240, the optional granularity information retriever 250, the optional length determiner 260 and the optional coding unit information retriever 270. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks. A non-limiting example of program code used to define the device 200 include single instruction multiple data (SIMD) code.

Alternatively the device 200 can be implemented in hardware. There are numerous variants of circuitry elements that can be used and combined to achieve the functions of the units of the device 200. Such variants are encompassed by the embodiments. Particular examples of hardware implementation of the device 200 is implementation in digital signal processor (DSP) hardware and integrated circuit technology, including both general-purpose electronic circuitry and application-specific circuitry.

Figure 12:
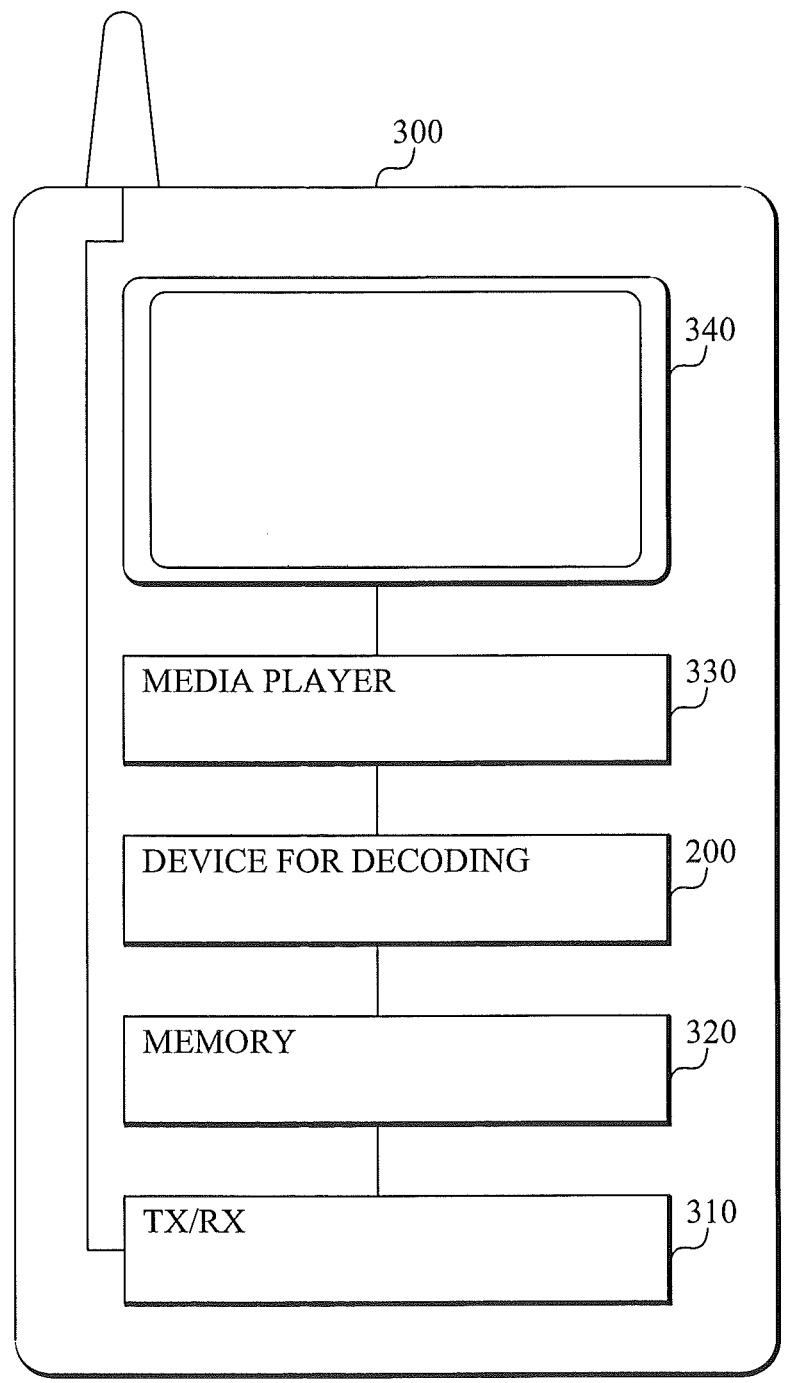
FIG. 12 is a schematic block diagram of a media terminal according to an embodiment.

FIG. 12 is a schematic block diagram of a media terminal 300 housing a device 200 for decoding a coded representation of a picture. The media terminal 300 can be any device having media decoding functions that operates on an encoded bit stream, such as a video stream of encoded video frames to thereby decode the video frames and make the video data available. Non-limiting examples of such devices include mobile telephones and other portable media players, computers, decoders, game consoles, etc.

The media terminal 300 comprises a memory 320 configured to a coded representation of a picture, such as encoded video frames. The coded representation can have been generated by the media terminal 300 itself. In such a case, the media terminal 300 preferably comprises a media engine or recorder together with a connected encoder, such as the device for coding a picture of FIG. 10. Alternatively, the coded representations are generated by some other device and wirelessly transmitted or transmitted by wire to the media terminal 300. The media terminal 300 then comprises a transceiver 310 (transmitter and receiver) or input and output port to achieve the data transfer.

The coded representation is brought from the memory 320 to the device 200 for decoding, such as the device illustrated in FIG. 11. The device 200 then decodes the coded representation into a decoded picture or as decoded video frames. The decoded data is provided to a media player 330 that is configured to render the decoded picture data or video frames into data that is displayable on a display or screen 340 of or connected to the media terminal 300.

In FIG. 12, the media terminal 300 has been illustrated as comprising both the device 200 for decoding and the media player 330. This should, however, merely be seen as an illustrative but non-limiting example of an implementation embodiment for the media terminal 300. Also distributed implementations are possible where the device 200 and the media player 330 are provided in two physically separated devices are possible and within the scope of media terminal 300 as used herein. The display 340 could also be provided as a separate device connected to the media terminal 300, where the actual data processing is taking place.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of coding a picture comprising N≥2 slices, said method comprising:
    generating, for each slice of said N slices, a coded slice representation based on pixel values of pixels in said slice;
    setting a slice flag associated with a first slice of said N slices to a first defined value to indicate that said first slice has its slice start at a defined position in said picture;
    setting, for each slice of N−1 remaining slices of said N slices, a slice flag associated with said slice to a second defined value;
    generating, for each slice of said N−1 remaining slices, a slice address allowing identification of a position of a first coding unit of said slice within said picture;
    generating a coded picture representation of said picture comprising said N coded slice representations, said N−1 slice addresses and said N slice flags; and
    determining a length of said N−1 slice addresses in terms of number of bits as one of ceil($\log_2(P)$) and ceil($\log_2(P-1)$), wherein ceil( ) denotes the ceiling function defined as ceil(x)=$\lceil x \rceil$ and outputs the smallest integer not less than x, and P denotes a total number of possible slice addresses in said picture;
    wherein generating said slice address comprises generating, for each slice of said N−1 remaining slices, said slice address by encoding a codeword having said length.

2. The method according to claim 1, wherein said picture comprises multiple largest coding units, which have a selected size in terms of number of pixels and can be hierarchically split into multiple coding units having respective sizes that are smaller than said selected size, said method further comprising determining a length of said N−1 slice addresses in terms of number of bits based on a hierarchical granularity selected for said picture, said hierarchical granularity defines a hierarchical level for slice border alignment within said picture, where said hierarchical level defines a size of a smallest possible addressable coding unit at which a start of a slice in said picture can be aligned.

3. The method according to claim 2, wherein determining said length of said N−1 slice addresses comprises determining said length of said N−1 slice addresses based on said hierarchical granularity and based on a total number of largest coding units in said picture.

4. A method of decoding a coded picture representation of a picture comprising N≥2 slices, said method comprising:
    retrieving, from said coded picture representation, a slice flag associated with a slice of said N slices;
    assigning said pixel values to pixels in a first portion of said picture if a slice flag associated with said slice and retrieved from said coded picture representation has a first defined value;
    retrieving, if said slice flag associated with said slice has a second defined value, a slice address associated with said slice from said coded picture representation;
    assigning, if said slice flag associated with said slice has said second defined value, said pixel values to pixels in a portion of said picture identified based on said slice address;
    determining, if said slice flag associated with said slice has said second defined value, a first representation of the coordinates of a position of a largest coding unit within said picture based on said slice address;
    determining, if said slice flag associated with said slice has said second defined value, a second representation of the coordinates of a position of a first coding unit of said slice within said largest coding unit; and
    identifying said portion of said picture based on said first representation and said second representation.

5. The method according to claim 4, further comprising determining, if said slice flag associated with said slice has said second defined value, a length of said slice address in terms of number of bits as one of ceil($\log_2(P)$) and ceil($\log_2(P-1)$), wherein ceil( ) denotes the ceiling function defined as ceil(x)=$\lceil x \rceil$ and outputs the smallest integer not less than x, and P denotes a total number of possible slice addresses in said picture.

6. The method according to claim 4, wherein said picture comprises multiple largest coding units, which have a selected size in terms of number of pixels and can be hierarchically split into multiple coding units having respective sizes that are smaller than said selected size, said method further comprising:
    retrieving, if said slice flag associated with said slice has said second defined value, information of a hierarchical granularity associated with said coded picture presentation, said hierarchical granularity defining a hierarchical level for slice border alignment within said picture, said hierarchical level defining a size of a smallest possible addressable coding unit at which a start of a slice in said picture can be aligned; and
    determining a length of said slice address in terms of number of bits based on said information of said hierarchical granularity.

7. The method according to claim 6, further comprising retrieving information of a total number of largest coding units in said picture from said coded picture representation, wherein determining said length of said slice address comprises determining said length of said slice address based on said information of said hierarchical granularity and based on said total number of largest coding units.

8. The method according to claim 4, wherein said picture comprises multiple largest coding units, which have a selected size in terms of number of pixels and can be hierarchically split into multiple coding units having respective sizes that are smaller than said selected size, said method further comprising:
    retrieving, if said slice flag associated with said slice has said second defined value, information of a hierarchical granularity associated with said coded picture presentation, said hierarchical granularity defining a hierarchical level for slice border alignment within said picture, said hierarchical level defining a size of a smallest possible addressable coding unit at which a start of a slice in said picture can be aligned; and
    determining a length of said slice address in terms of number of bits based on said information of said hierarchical granularity, wherein determining said first representation comprises determining, if said slice flag associated with said slice has said second defined value, said first representation based on said slice address and said information of said hierarchical granularity.

9. The method according to claim 4, wherein said picture comprises multiple largest coding units, which have a selected size in terms of number of pixels and can be hierarchically split into multiple coding units having respective sizes that are smaller than said selected size, said method further comprising:

retrieving, if said slice flag associated with said slice has said second defined value, information of a hierarchical granularity associated with said coded picture presentation, said hierarchical granularity defining a hierarchical level for slice border alignment within said picture, said hierarchical level defining a size of a smallest possible addressable coding unit at which a start of a slice in said picture can be aligned; and determining a length of said slice address in terms of number of bits based on said information of said hierarchical granularity, wherein determining said second representation comprises determining, if said slice flag associated with said slice has said second defined value, said second representation based on said slice address, said information of said hierarchical granularity and said first representation.

10. A device for coding a picture comprising N≥2 slices, said device comprising:

a representation generator configured to generate, for each slice of said N slices, a coded slice representation based on pixel values of pixels in said slice;

a flag setter configured to set a slice flag associated with a first slice of said N slices to a first defined value and set, for each slice of N−1 remaining slices of said N slices, a slice flag associated with said slice to a second defined value to indicate that said first slice has its slice start at a defined position in said picture;

an address generator configured to generate, for each slice of said N−1 remaining slices, a slice address allowing identification of a position of a first coding unit of said slice within said picture;

a representation manager configured to generate a coded picture representation of said picture comprising said N coded slice representations, said N−1 slice addresses and said N slice flags; and a length determiner configured to determine a length of said N−1 slice addresses in terms of number of bits as one of $\text{ceil}(\log_2(P))$ and $\text{ceil}(\log_2(P-1))$, wherein ceil( ) denotes the ceiling function defined as $\text{ceil}(x)=\lceil x \rceil$ and outputs the smallest integer not less than x, and P denotes a total number of possible slice addresses in said picture;

wherein the address generator generates said slice address by generating, for each slice of said N−1 remaining slices, said slice address by encoding a codeword having said length.

11. The device according to claim 10, wherein said picture comprises multiple largest coding units, which have a selected size in terms of number of pixels and can be hierarchically split into multiple coding units having respective sizes that are smaller than said selected size, said device further comprising a length determiner configured to determine a length of said N−1 slice addresses in terms of number of bits based on a hierarchical granularity selected for said picture, said hierarchical granularity defines a hierarchical level for slice border alignment within said picture, where said hierarchical level defines a size of a smallest possible addressable coding unit at which a start of a slice in said picture can be aligned.

12. The device according to claim 11, wherein said length determiner is configured to determine said length of said N−1 slice addresses based on said hierarchical granularity and based on a total number of largest coding units in said picture.

13. A device for decoding a coded picture representation of a picture comprising N≥2 slices, said device comprising:

a representation retriever configured to retrieve, from said coded picture representation, a slice flag associated with a slice of said N slices;

an address retriever configured to retrieve, if a slice flag associated with said slice and retrieved from said coded picture representation has a second defined value, a slice address associated with said slice from said coded picture representation; and a value assigner configured to assign said pixel values to pixels in a first portion of said picture if said slice flag associated with said slice has a first defined value and assign, if said slice flag associated with said slice has said second defined value, said pixel values to pixels in a portion of said picture identified based on said slice address;

wherein said address retriever is configured to i) determine, if said slice flag associated with said slice has said second defined value, a first representation of the coordinates of a position of a largest coding unit within said picture based on said slice address, ii) determine, if said slice flag associated with said slice has said second defined value, a second representation of the coordinates of a position of a first coding unit of said slice within said largest coding unit and iii) identify said portion of said picture based on said first representation and said second representation.

14. The device according to claim 13, further comprising a length determiner configured to determine, if said slice flag associated with said slice has said second defined value, a length of said N−1 slice addresses in terms of number of bits as one of $\text{ceil}(\log_2(P))$ and $\text{ceil}(\log_2(P-1))$, wherein ceil( ) denotes the ceiling function defined as $\text{ceil}(x)=\lceil x \rceil$ and outputs the smallest integer not less than x and P denotes a total number of possible slice addresses in said picture.

15. The device according to claim 13, wherein said picture comprises multiple largest coding units, which have a selected size in terms of number of pixels and can be hierarchically split into multiple coding units having respective sizes that are smaller than said selected size, said device further comprising:

a granularity information retriever configured to retrieve, if said slice flag associated with said slice has said second defined value, information of a hierarchical granularity associated with said coded picture presentation, said hierarchical granularity defining a hierarchical level for slice border alignment within said picture, said hierarchical level defining a size of a smallest possible addressable coding unit at which a start of a slice in said picture can be aligned; and a length determiner configured to determine a length of said slice address in terms of number of bits based on said information of said hierarchical granularity.

16. The device according to claim 15, further comprising a coding unit information retriever configured to retrieve information of a total number of largest coding units in said picture from said coded picture representation, wherein said length determiner is configured to determine said length of said slice address based on said information of said hierarchical granularity and based on said total number of largest coding units.

17. The device according to claim 13, wherein said picture comprises multiple largest coding units, which have a selected size in terms of number of pixels and can be hierarchically split into multiple coding units having respective sizes that are smaller than said selected size, said device further comprising:

a granularity information retriever configured to retrieve, if said slice flag associated with said slice has said second defined value, information of a hierarchical granularity associated with said coded picture presentation, said hierarchical granularity defining a hierarchical level for slice border alignment within said picture, said hierarchical level defining a size of a smallest possible addressable coding unit at which a start of a slice in said picture can be aligned; and a length determiner configured to determine a length of said slice address in terms of number of bits based on said information of said hierarchical granularity, wherein said address retriever is configured to determine, if said slice flag associated with said slice has said second defined value, said first representation based on said slice address and said information of said hierarchical granularity.

18. The device according to claim 13, wherein said picture comprises multiple largest coding units, which have a selected size in terms of number of pixels and can be hierarchically split into multiple coding units having respective sizes that are smaller than said selected size, said device further comprising:

a granularity information retriever configured to retrieve, if said slice flag associated with said slice has said second defined value, information of a hierarchical granularity associated with said coded picture presentation, said hierarchical granularity defining a hierarchical level for slice border alignment within said picture, said hierarchical level defining a size of a smallest possible addressable coding unit at which a start of a slice in said picture can be aligned; and a length determiner configured to determine a length of said slice address in terms of number of bits based on said information of said hierarchical granularity, wherein said address retriever is configured to determine, if said slice flag associated with said slice has said second defined value, said second representation based on said slice address, said information of said hierarchical granularity and said first representation.

19. A media terminal comprising:

a memory configured to store the coded picture representation comprising multiple slices and being composed of multiple largest coding units having a selected size in terms of number of pixels; and a device for decoding said coded picture representation according to claim 13.

20. A media terminal comprising:

a memory configured to store a picture comprising $N \geq 2$ slices; and a device for coding the picture comprising $N \geq 2$ slices according to claim 10.

* * * * *

UNITED STATES PATENT AND TRADEMARK OFFICE
CERTIFICATE OF CORRECTION

PATENT NO. : 9,937,393 B2  
APPLICATION NO. : 14/465111  
DATED : April 10, 2018  
INVENTOR(S) : Sjöberg et al.

Page 1 of 1

It is certified that error appears in the above-identified patent and that said Letters Patent is hereby corrected as shown below:

In the Specification

Column 7, Line 36, delete "LCU." and insert -- LCUs. --, therefor.

Column 10, Line 4, delete "SFS." and insert -- SPS. --, therefor.

Column 10, Line 52, delete "sub-LOU" and insert -- sub-LCU --, therefor.

Column 10, Line 56, delete "LOU." and insert -- LCU. --, therefor.

Column 15, Line 13, delete "value, A" and insert -- value. A --, therefor.

Signed and Sealed this  
Seventeenth Day of July, 2018

Andrei Iancu  
*Director of the United States Patent and Trademark Office*